United States Patent [19]

John, Jr.

[11] Patent Number: 4,735,541
[45] Date of Patent: Apr. 5, 1988

[54] TUBE DRIVE APPARATUS EMPLOYING FLEXIBLE DRIVE BELTS

[75] Inventor: Clarence D. John, Jr., Penn Hills Township, Allegheny County, Pa.

[73] Assignee: Westinghouse Electric Corp., Pittsburgh, Pa.

[21] Appl. No.: 875,170

[22] Filed: Jun. 17, 1986

[51] Int. Cl.[4] .......................................... B65H 51/00
[52] U.S. Cl. ..................... 414/431; 414/432
[58] Field of Search .................. 414/431, 432, 433; 198/624

[56] References Cited

U.S. PATENT DOCUMENTS

| | | | |
|---|---|---|---|
| 2,538,950 | 1/1951 | Schryber | 414/432 |
| 3,178,047 | 4/1965 | Norton | 414/432 |
| 3,224,254 | 12/1965 | Loving | 414/431 X |
| 3,447,074 | 5/1969 | Sower et al. | 414/431 X |
| 3,664,531 | 5/1972 | Magnusson et al. | |
| 3,679,145 | 7/1972 | Guekster | 414/431 X |
| 3,718,247 | 2/1973 | Dreher | |
| 3,743,124 | 7/1973 | Jarvis | 414/431 |
| 4,554,958 | 11/1985 | Schmidt | 414/432 X |

FOREIGN PATENT DOCUMENTS

557882  2/1930  Fed. Rep. of Germany ...... 414/432
216208  8/1941  Switzerland ...................... 414/431

Primary Examiner—Peter A. Aschenbrenner

[57] ABSTRACT

An improved tube drive apparatus includes drive units disposed in respective orientations angularly displaced about and radially extending from a longitudinal centerline of a tube to be driven by the drive units and a drive train drivingly coupling a motor to the drive units for transmitting driving motion thereto. Each drive unit includes an endless flexible drive belt, a pair of spaced rotatable members entraining the drive belt such that an end of the belt drivingly engages the tube for transmitting driving motion thereto. One rotatable member is drivingly coupled to the drive train and the other rotatable member is angularly adjustable relative to the one rotatable member and the centerline of the tube such that runs of the belt can be changed between generally parallel and criss-cross orientations for varying the motion of the tube produced by engagement of the belt from solely axial rotation to solely longitudinal movement and any combination of the two motions therebetween. A ratchet screw is provided for adjusting the angular relationship between the two rotatable members and thereby the degree of twist in the drive belt and the direction of motion of the tube.

13 Claims, 6 Drawing Sheets

TUBE DRIVE APPARATUS EMPLOYING FLEXIBLE DRIVE BELTS

BACKGROUND OF THE INVENTION

1. Field of the Invention

The present invention relates generally to tube quality inspection and, more particularly, is concerned with an improved tube drive apparatus employing radially oriented flexible drive belts being arranged to drivingly engage a tube so as to axially rotate and/or longitudinally move it along a path past an ultrasonic inspection device.

2. Description of the Prior Art

Because of their critical roles as fuel, control and instrumentation rods in nuclear reactors, tubes composed of zirconium and other materials must meet very stringent quality control standards. Ultrasonic testing is one common method used to identify material flaws or unacceptable dimension deviations in the tubes.

One conventional tube inspection technique involves moving a tube past an ultrasonic testing device. The testing device includes an ultrasonic source with transducers located adjacent the moving tube which are capable of transmitting an ultrasonic signal toward the moving tube and receiving an echo from the tube, and then analyzing it to determine the acceptability of the tube. The ultrasonic source is capable of transmitting pulses in the megahertz range and so to effectively take advantage of this the tube is moved longitudinally past the ultrasonic source and sometimes simultaneously rotated axially which causes the pulses to strike along a helical pattern or path around the tube resulting in a maximum number of meaningful data points.

One conventional drive apparatus which is used for moving tubes in the helical path past the ultrasonic testing device employs an arrangement of three rotating rollers positioned radially with respect to the axis or centerline of the tube at approximately 120 degree intervals from one another around the circumference of the tube. The rollers are angularly oriented with respect to the tube centerline to produce simultaneously longitudinal movement and axial rotation of the tube. Each of the rollers has a polyurethane rim which engages the tube. The rim is mounted on a steel wheel that is driven through a steel-core belt. Each roller is driven via the steel-core belt by a drive wheel and the shaft of the roller can be inclined to that of the drive wheel to adjust the longitudinal movement and axial rotation of the tube.

With such an arrangement, if the rim of a roller develops a flat spot from friction caused by improper alignment or a temporary binding condition, then every revolution of the roller will impart a load which can possibly dent the tube and the smooth motion of the tube will be interrupted causing difficulty in synchronizing the ultrasonic source with the passing tube. Furthermore, the steel-core belt which drives each roller, although very durable, is sufficiently rigid as to restrict the range of the angle at which the roller shaft can be oriented relative to the tube centerline to approximately ten degrees. There also exists a need to measure wall thickness variations in an axial direction which will indicate the pitch of any spiral that may have developed in the tube during the pilger forming process.

Consequently, a need exists for improvements in the tube drive apparatus so as to avoid the problems and limitations of the conventional drive arrangement used heretofore.

SUMMARY OF THE INVENTION

The present invention provides an improved tube drive apparatus designed to satisfy the aforementioned needs. The apparatus employs radially oriented flexible drive belts being capable of drivingly engaging a tube at any angle within a ninety-degree range relative to the centerline of the tube. It is the flexibility of the belt which allows the shafts of the belted wheel and the drive wheel that entrain the belt to be inclined relative to each other anywhere from zero to ninety degrees, causing the tube to correspondingly merely rotate with no longitudinal movement or to longitudinally move with no rotation. This was impossible to achieve heretofore because of the relative rigidity of the previously used steel-core belts. The drive apparatus can thus be adjusted to axially rotate and longitudinally move the tube at a large number of combinations of rotational and longitudinal speeds along a helical or straight path past the ultrasonic inspection source. In addition, by using belts to contact the tube rather than rollers, the greater length of the belt compared to the circumference of the roller provides a contact length equivalent to that of a much larger diameter roller which results in a belt life much greater than that of the smaller diameter polyurethane rollers. In summary, the versatility and performance of the improved drive apparatus of the present invention are greatly enhanced over the prior drive apparatus.

Accordingly, the present invention relates to an improved tube drive apparatus having a plurality of drive units, mounting means disposing the drive units in respective orientations angularly displaced about and radially extending from a longitudinal centerline of a tube to be driven by the drive units, and power means drivingly coupled to the drive units for transmitting driving motion thereto. Each of the drive units comprises an endless flexible drive member and a pair of spaced rotatable members entraining the flexible drive member such that the flexible member can drivingly engage a tube for transmitting driving motion thereto. In addition, support means are provided for mounting the rotatable members in their spaced relation with at least one of the rotatable members being angularly displaceable with respect to the other and relative to the centerline of the tube such that the driving motion transmitted to the tube by the flexible member can be apportioned between rotational and longitudinal motion. Further, adjustment means are connected to the support means for changing the angular relationship of the one rotatable member relative to the centerline of the tube for correspondingly changing the direction of the motion applied to the tube.

The present invention also relates to an improved tube drive apparatus wherein each of the drive units of the apparatus includes an endless flexible drive belt and a pair of spaced rotatable members entraining the flexible drive belt such that a face or an end of the belt drivingly engages the tube for transmitting driving motion thereto. One of the rotatable members is drivingly coupled to power means which transmits rotational motion thereto. Also, support means support the rotatable members in spaced relation with at least one of the rotatable members being angularly displaceable with respect to the other and relative to the centerline of the tube such that a pair of runs of the belt can be changed between generally parallel and criss-cross orientations and the driving motion transmitted to the tube by the flexible drive belt end can be apportioned between rotational and longitudinal motion. Further, adjustment means is operatively connected to the support means for changing the angular relationship of the one rotatable member with respect to the other and relative to the centerline of the tube and thereby changing the runs of the belt between their parallel and criss-cross orientations and thereby the end of the belt relative to the centerline of the tube for varying the motion of the tube produced by engagement of the belt from solely axial rotation to solely longitudinal movement and any combination of the two motions therebetween.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Figure 1:
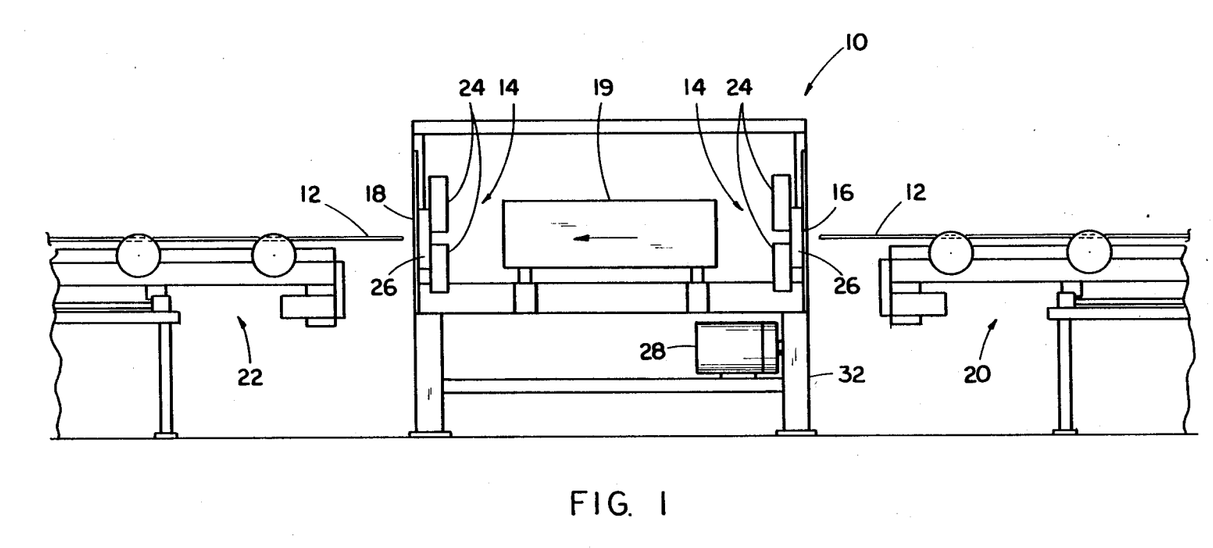
FIG. 1 is a side elevational view of a tube inspection station employing the improved tube drive apparatus of the present invention at both entry and exit ends of the station and also illustrating fragmentary portions of tube delivery and removal apparatuses disposed adjacent to the opposite entry and exit ends of the station.

Referring now to the drawings, and particularly to FIG. 1, there is shown a conventional station, generally designated 10, for ultrasonically inspecting tubes 12 to be used in fuel, control and instrumentation rods of a nuclear fuel assembly. The tube inspection station 10 employs the improved tube drive apparatus 14 of the present invention at both entry and exit ends 16,18 for driving the tubes 12 (each being about fifteen feet in length but connected together by couplers so as to provide the tubes in a continuous string) in the direction of the arrow from left to right through a conventional inspection tank 19 in the station 10 past conventional ultrasonic testing apparatus (not shown) associated therewith. The tubes 12 are infed to the tank 19 by the right one of the pair of improved drive apparatuses 14 from a tube delivery apparatus 20 disposed upstream of the entry end 16 of the station and propelled from the tank by the left one of the improved drive apparatuses 14 to a tube removal apparatus 22 disposed downstream of the exit end 18 of the station. Since the type of inspection performed on the tubes 12 comprises no part of the present invention, it will not be described any further herein. The improved tube drive apparatus 14 of the present invention could be used to drive tubes for purposes other than quality inspection.

Figure 2:
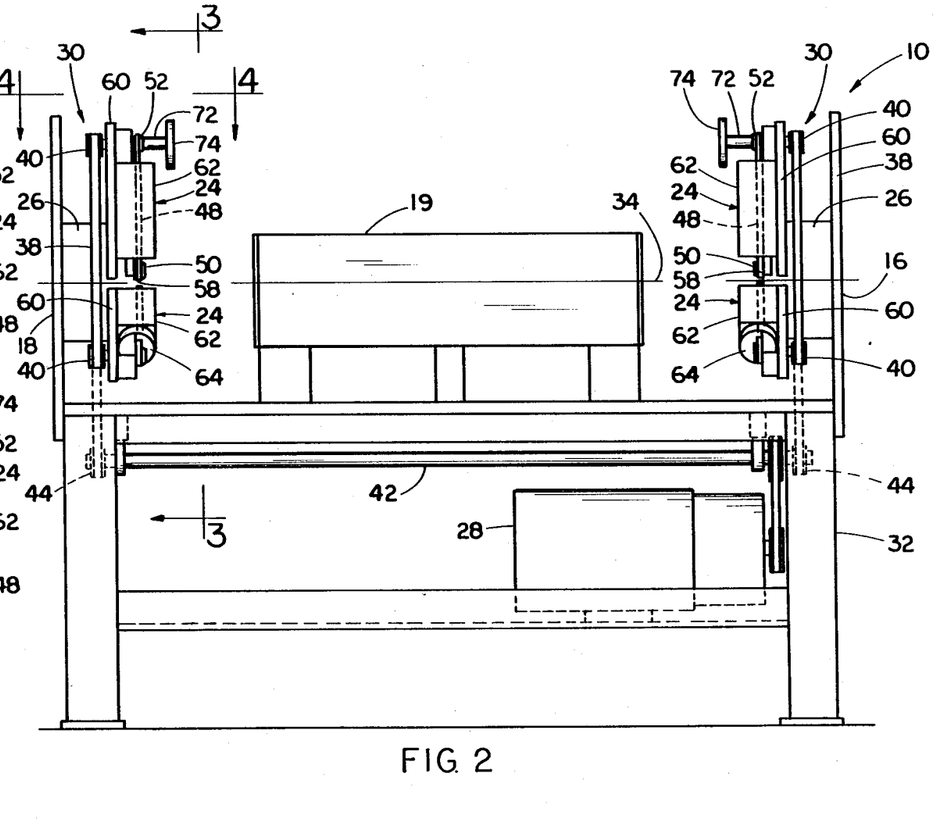
FIG. 2 is an enlarged side elevational view of the tube inspection station of FIG. 1, showing the components of the improved tube drive apparatus in greater detail.
Figure 3:
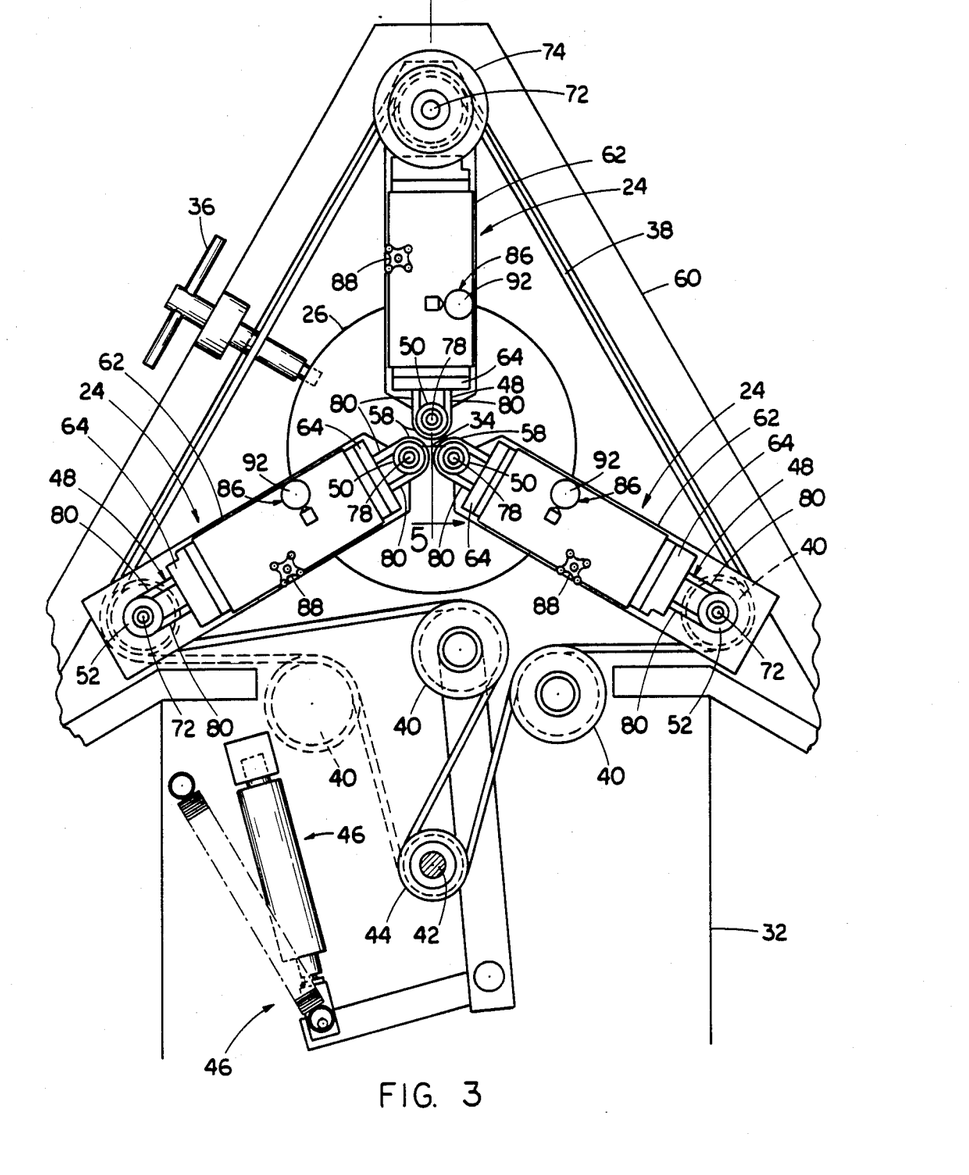
FIG. 3 is an enlarged end elevational view of the improved tube drive apparatus located at the entry end of the inspection station as seen along line 3—3 of FIG. 2, showing the three radially oriented drive units of the improved apparatus.
Figure 4:
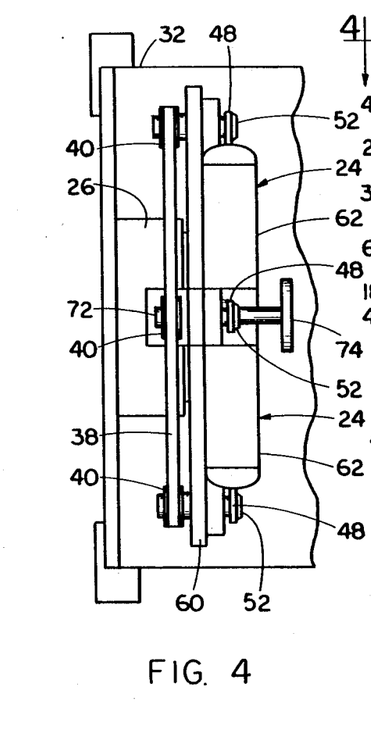
FIG. 4 is an enlarged top plan view of the improved tube drive apparatus located at the entry end of the inspection station as seen along line 4—4 of FIG. 2.

Referring now to FIGS. 2 to 4, in addition to FIG. 1, each of the improved tube drive apparatuses 14 at the respective entry and exit ends 16,18 of the inspection station 10 basically includes a plurality of drive units 24, means in the form of a three-jaw self-centering scroll chuck 26 for mounting the drive units 24, and power means in the form of a motor 28 and drive train 30 for transmitting driving motion to the drive units 24.

The chuck 26 is mounted on the inspection station frame 32 and, in turn, mounts the drive units 26 in respective orientations angularly displaced about and radially extending with respect to the longitudinal centerline 34 of the tube 12 which is received through the chuck 26. The adjustable scroll chuck 26 is per se an off-the-shelf device whose structure and mode of operation is conventionally well known. As seen in Fig. 3, a wrench 36 is used to radially adjust the positions of the jaws of the chuck 26 to accommodate tubes of different diameter sizes. Concurrently as the radial configuration of the chuck 26 is adjusted to fit the particular diametric size of the tube 12, the radial positions of the drive units 24 are also adjusted to fit the tube so as to ensure driving engagement therewith.

The drive motor and trains 28,30 are mounted on the inspection station frame 32 so as to transmit drive motion to each of the improved drive apparatus 14. One drive train 30, composed of a motion transmitting belt 38 and a series of pulleys 40, is associated with each improved drive apparatus 14, whereas only one drive motor 28 supplies rotary motion to both drive trains via a common cross shaft 42 rotatably mounted on the frame 32 with drive pulleys 44 attached on opposite ends thereof. As seen in FIG. 3, a pivotal take-up and expansion mechanism 46 is operatively associated with one of the pulleys 40 of each drive train 30 for maintaining the motion transmitting belt 38 of the respective drive train 30 in a taut driving condition regardless of radial positions of the drive units 24.

As seen in FIGS. 2 to 4, but more particularly in FIGS. 5 to 7 and 13, each drive unit 24 includes an endless flexible member in the form of a drive belt 48, such as one composed of polyurethane, and a pair of spaced inner and outer rotatable members in the form of circumferentially grooved wheels or pulleys 50,52 which entrain the flexible drive belt 48 in a taut driving condition. The inner rotatable pulley 50 has a belt-carrying groove 54 which is shallower than the groove 56 in the outer pulley such that the end 58 of the endless drive belt 48 traveling around the inner pulley 50 extends outwardly beyond its periphery for drivingly engaging the tube and thereby transmitting driving motion thereto.

Figures 5, 7:
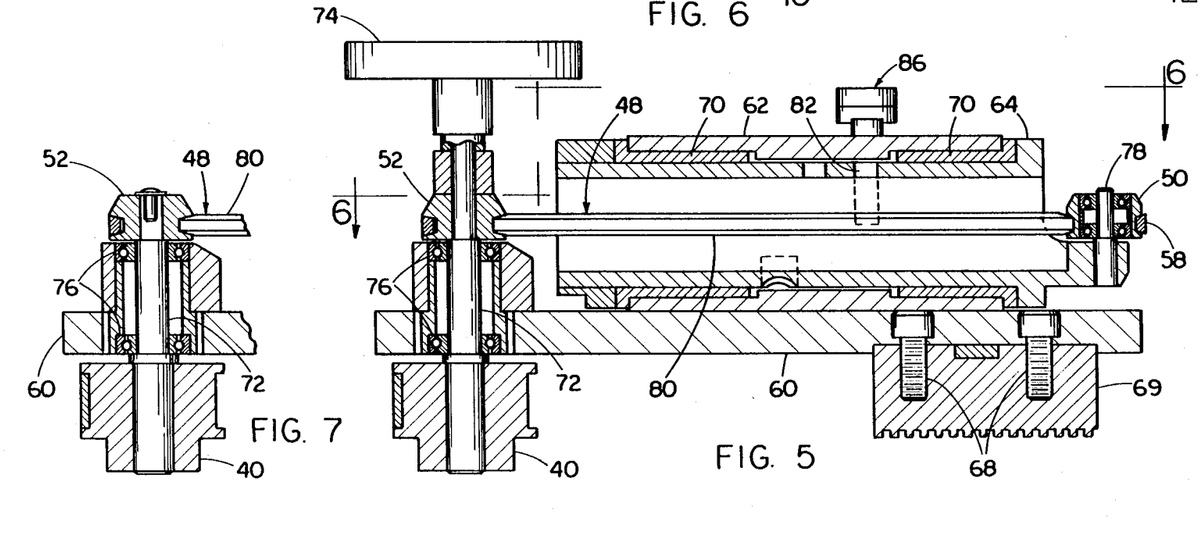
FIG. 5 is an enlarged longitudinal sectional view of one of the radially oriented drive units of the improved apparatus as taken along line 5—5 of FIG. 3.
FIG. 7 is a fragmentary sectional view of an end of another drive unit of the improved apparatus being similar to the corresponding end of the one drive unit of FIG. 5, but without a handle for manually rotating the improved apparatus.
Figure 6:
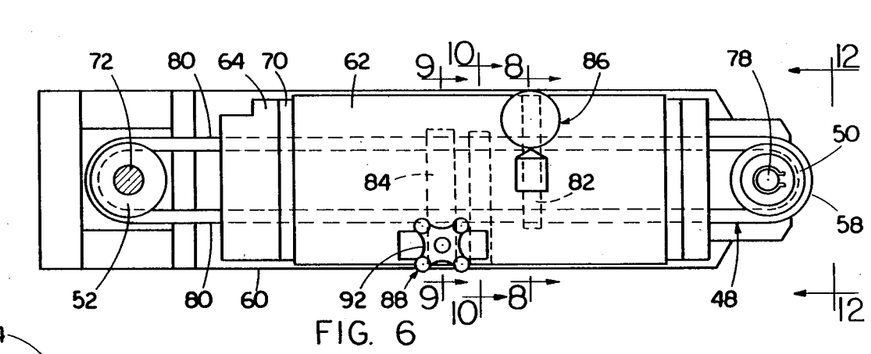
FIG. 6 is a side elevational view, partly in section, of the one drive unit of the improved apparatus as taken along line 6—6 of FIG. 5.
Figure 8:
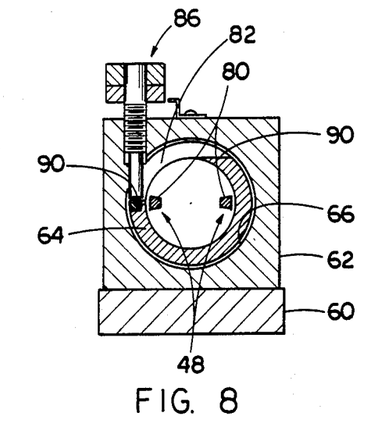
FIG. 8 is an enlarged cross-sectional view of the one drive unit as taken along line 8—8 of FIG. 6, showing a calibration gage of the drive unit disposed in one of the circumferential slots defined in its rotatable inner cylinder and engaged against one of the stops defined therein.
Figure 9:
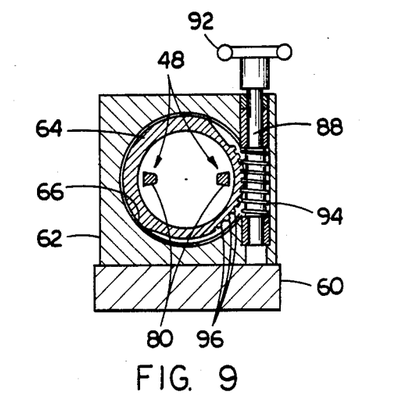
FIG. 9 is another enlarged cross-sectional view of the one drive units as taken along line 9—9 of FIG. 6, showing a worm screw of the drive unit for rotating the inner cylinder to change the inclination of the belted wheel of the unit relative to its drive wheel.
Figure 10:
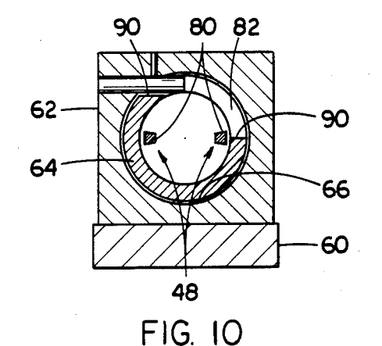
FIG. 10 is yet another enlarged cross-sectional view of the one drive unit as taken along line 10—10 of FIG. 6, showing one extreme stop position of the rotatable inner cylinder in which the opposite runs of the belt of the unit extend parallel and adjacent to the tube are oriented generally perpendicular to the centerline of the tube for only axially rotating the tube.

Furthermore, each drive unit 24 includes support means in the form of a mounting plate 60, an outer housing 62 attached in fixed relation to the plate 60 and an inner hollow cylinder 64 rotatably disposed in a cylindrical bore 66 through the outer housing 62. The drive unit 24 is mounted to the scroll chuck 26 by the connection of the plate 60 at its inner end via bolts 68 to one of the jaws 69 of the chuck 26. A bearing 70 supported in the outer end of the plate 60 rotatably mounts a stub shaft 72 which has one of the pulleys 40 of the drive train 30 attached on its one end and the outer rotatable pulley 52 of the drive unit 24 attached on its opposite end. Parenthetically, it should be mentioned here that one of the drive units 24 has a wheel handle 74 attached on its outer stub shaft 72 by which the drive train 30 can be manually operated for moving the drive belts 48 of the drive units 24 and thereby moving the tube 12 by hand. The stub shafts 72 of the other drive units 24, such as seen in FIG. 7, only have the outer pulley 52 on the end thereof since a handle 74 is not necessary on each drive unit.

Figure 11:
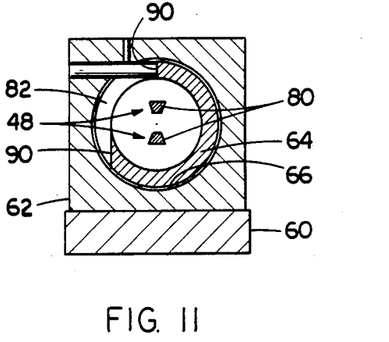
FIG. 11 is an enlarged cross-sectional view of the one drive unit similar to that of FIG. 10, except showing the opposite extreme stop position of the rotatable inner cylinder in which the opposite runs of the belt of the unit criss-cross and adjacent to the tube are oriented generally parallel to the centerline of the tube for only longitudinally moving the tube.
Figure 12:
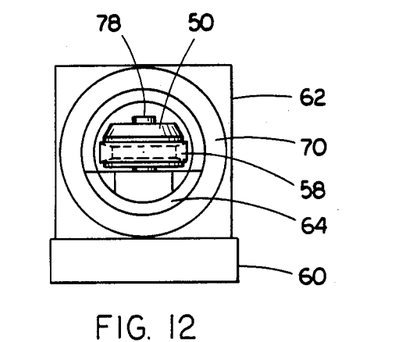
FIG. 12 is an end view of the one drive unit as seen along line 12—12 of FIG. 6.
Figure 13:
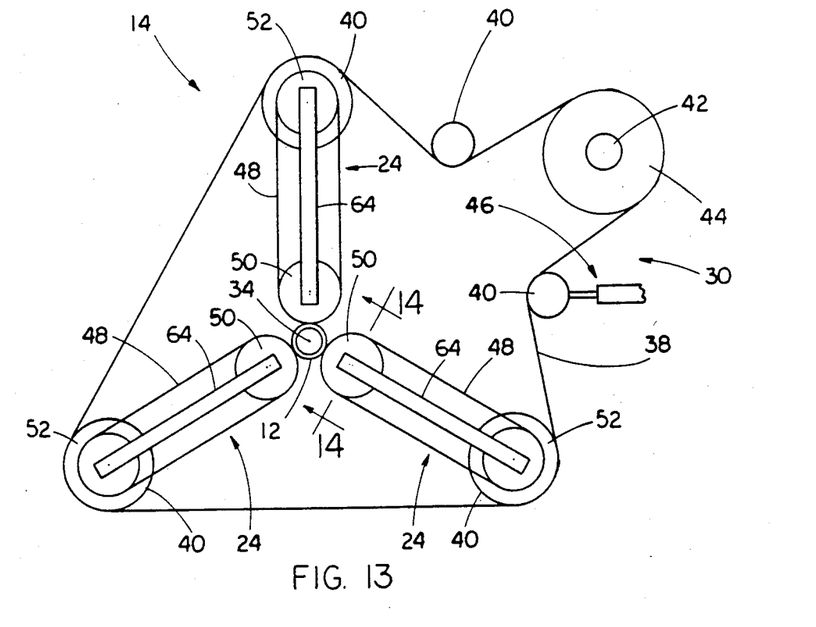
FIG. 13 is a schematic representation of the improved tube drive apparatus of the present invention.

As mentioned above, the outer housing 62 is attached in fixed relation to the mounting plate 60. The inner hollow cylinder 64 is disposed for rotation relative to the housing 62 and plate 60 by a bearing 76 mounted in the cylindrical bore 66 defined through the housing 62. Another shorter stub shaft 78 is rotatably supported on an inner end of the hollow cylinder 64 and has the inner pulley 50 of the drive unit 24 attached thereon. As seen in FIG. 5 and 12, the inner and outer pulleys 50,52 are thus aligned through and spaced from one another at opposite ends of the hollow interior of the cylinder 64 such that the drive belt 48 entrained about the pulleys can pass unobstructed through the cylinder. Due to the fact that the cylinder 64 which supports the inner pulley 50 is rotatable relative to the outer housing 62 and mounting plate 60 which supports the outer pulley 52, the inner pulley 50 and inner end 58 of the drive belt 48 entrained about the pulley 50 are angularly displaceable with respect to the outer pulley 52 and thus also relative to the centerline 34 of the tube. Thus, due to the flexibility of the drive belt 48 and by rotating the inner cylinder 64 relative to the outer housing 62, runs 80 of the drive belt 48 can be changed anywhere between generally parallel (FIGS. 6 and 8 to 10) and criss-cross (FIG. 11) orientations and correspondingly the driving motion transmitted to the tube 14 by the flexible drive belt end 58 can be apportioned anywhere between pure rotational and pure longitudinal motion.

Figure 14:
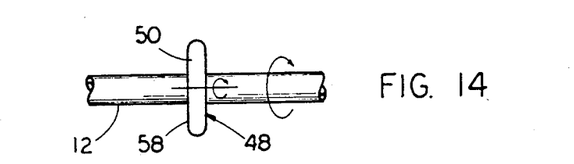
FIG. 14 is a schematic representation of a fragmentary portion of the improved apparatus as seen along line 14—14 of FIG. 13, showing the belted wheel of one drive unit disposed generally perpendicular to the centerline of the tube for only axially rotating the tube.
Figure 15:
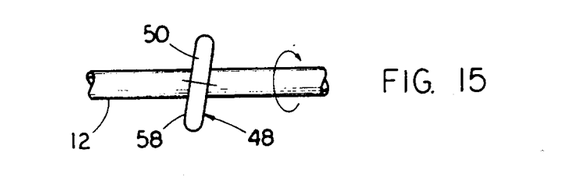
FIG. 15 is another schematic representation similar to that of FIG. 14, but showing the belted wheel disposed at an acute angle to the centerline of the tube for both axially rotating and longitudinally moving the tube.
Figure 16:
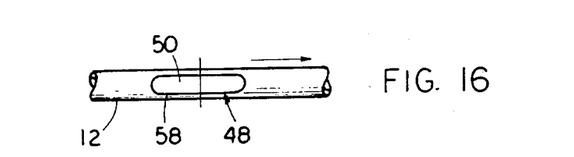
FIG. 16 is still another schematic representation similar to that of FIG. 14, but showing the belted wheel disposed generally parallel to the centerline of the tube for only longitudinally moving the tube.

Finally, as seen in FIGS. 5, 6 and 8 to 10, each drive unit 24 includes adjustment means in the form of circumferentially-extending calibration and adjustment slots or recesses 82,84 and a calibration gage 86 and adjustment worm gear or ratchet screw 88 threadably connected to the outer housing 62 and extending into the respective recesses in the inner rotatable cylinder 64. The calibration recess 82 includes a pair of stops 90 defined at opposite ends thereof which represent ninety-degree angularly displaced extreme positions of cylinder 64 and thus of the inner pulley 50 and belt end 58. The calibration gage 86 is rotated to accurately preset where the positions of these stops 90 will actually be located. The outer end of the rachet screw 88 has a knob 92 for manually rotating the screw and a threaded inner end 94 adapted to mesh with teeth 96 defined in the adjustment recess 84. It is readily apparent that by rotating the ratchet screw 88, the inner cylinder 64 can be rotated ninety-degrees between the two extreme limits seen in FIGS. 10 and 11. Such rotation of the cylinder 64, as explained above, changes the angular relationship of the inner pulley 50 with respect to the outer pulley 52 and relative to the centerline 34 of the tube and thereby changing the runs 80 of the drive belt 48 between parallel (FIGS. 8 to 10) and criss-cross (FIG. 11) orientations. The end 58 of the drive belt 48 can thereby be angularly changed relative to the centerline of the tube so as to vary the motion of the tube produced by engagement of the belt end 58 from solely axial rotation, as schematically depicted in FIG. 14 to solely longitudinal movement, as schematically shown in FIG. 16, and any combination of the two motions therebetween, as schematically seen in FIG. 15.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. An improved tube drive apparatus having a plurality of drive units being disposed in respective orientations angularly displaced about and radially extending from a longitudinal centerline of a tube, each of said drive units comprising:
   (a) an endless flexible drive member having an end;
   (b) a pair of rotatable members mounted in a spaced relation with respect to each other and entraining said flexible drive member such that said end of said flexible member can drivingly engage the tube for transmitting driving motion thereto;
   (c) support means mounting said rotatable members in said spaced relation with respect to each other in a respective one of said orientations, at least one of said rotatabale members being angularly displaceable with respect to the other and relative to the centerline of the tube such that said driving motion transmitted to the tube by said flexible member end can be apportioned between rotational and longitudinal motion; and
   (d) adjustment means connected to said support means for changing the angular relationship of said one rotatable member with respect to the other and relative to the centerline of the tube.

2. The apparatus as recited in claim 1, further comprising:
   mounting means disposing said drive units in said respective orientations angularly displaced about and radially extending from the longitudinal centerline of the tube.

3. The apparatus as recited in claim 1, further comprising:
   power means drivingly coupled to said drive units for transmitting driving motion thereto.

4. The apparatus as recited in claim 3, wherein one of said rotatable members is drivingly coupled to said power means.

5. The apparatus as recited in claim 1, wherein said support means includes:
   an outer stationarily-disposed member rotatably mounting the other of said rotatable members; and
   an inner cylinder rotatably mounted to said outer member and rotatably mounting said one of said rotatable members such that upon rotation of said inner cylinder relative to said outer member said one rotatable member is angularly displaced relative to said other rotatable member.

6. The apparatus as recited in claim 5, wherein said inner cylinder is hollow and said rotatable members are disposed at respective opposite ends of said cylinder and aligned with each other through said cylinder such that said flexible drive member entrained by said rotatable members extends through said cylinder.

7. The apparatus as recited in claim 5, wherein said adjustment means includes:
   a calibration recess formed in said inner cylinder having opposite spaced stops defining rotational limits of said cylinder and thereby angular displacement limits of said one rotatable member relative to the other rotatable member; and
   a calibration gage threadably connected to said outer member and adjustably disposable in said recess for locating the positions of said rotational limits of said cylinder.

8. The apparatus as recited in claim 5, wherein said adjustment means includes:
   an adjustment recess formed in said inner cylinder having engageable elements defined therein; and
   a ratchet screw threadably connected to said outer member and engaged with said elements in said recess for rotating said inner cylinder relative to said outer member upon rotation of said ratchet screw.

9. An improved tube drive apparatus, comprising:
   (a) a plurality of drive units;
   (b) mounting means for receiving a tube to be driven by said drive units and disposing said drive units in respective orientations angularly displaced about and radially extending from a longitudinal centerline of the tube; and
   (c) power means drivingly coupled to said drive units for transmitting driving motion thereto;
   (d) each of said drive units including
      (i) an endless flexible drive belt,
      (ii) a pair of rotatable members supported in a spaced relation with respect to each other and entraining said flexible drive belt such that an end of said belt drivingly engages the tube for transmitting driving motion thereto, one of said members being drivingly coupled to said power means,
      (iii) support means mounted to said mounting means and, in turn, supporting said rotatable members in said spaced relation with respect to each other in a respective one of said orientations, at least one of said rotatable members being angularly displaceable with respect to the other and relative to the centerline of the tube such that a pair of runs of said belt can be changed between generally parallel and crisscross orientations and the driving motion transmitted to the tube by said flexible drive belt end can be apportioned between rotational and longitudinal motion, and
      (iv) adjustment means operatively connected to said support means for changing the angular relationship of said one rotatable member with respect to the other and relative to the centerline of the tube and thereby changing said runs of said belt between said orientations and said end of said belt relative to the centerline of the tube for varying the motion of the tube produced by engagement of the belt from solely axial rotation to solely longitudinal movement and any combination of the two motions therebetween.

10. The apparatus as recited in claim 9, wherein said support means includes:
    an outer member stationarily supported on said mounting member and, in turn, rotatably mounting the other of said rotatable members; and
    an inner cylinder rotatably mounted to said outer member and rotatably mounting said one of said rotatable members such that upon rotation of said inner cylinder relative to said outer member said one rotatable member is angularly displaced relative to said other rotatable member.

11. The apparatus as recited in claim 10, wherein said inner cylinder is hollow and said rotatable members are disposed at respective opposite ends of said cylinder and aligned with each other through said cylinder such that said flexible drive belt entrained by said rotatable members extends through said cylinder.

12. The apparatus as recited in claim 10, wherein said adjustment means includes:
- a calibration recess formed in said inner cylinder having opposite spaced stops defining rotational limits of said cylinder and thereby angular displacement limits of said one rotatable member relative to the other rotatable member; and
- a calibration gage threadably connected to said outer member and adjustably disposable in said recess for locating the positions of said rotational limits of said cylinder.

13. The apparatus as recited in claim 10, wherein said adjustment means includes:
- an adjustment recess formed in said inner cylinder having engageable elements defined therein; and
- a ratchet screw threadably connected to said outer member and engaged with said elements in said recess for rotating said inner cylinder relative to said outer member upon rotation of said ratchet screw.

* * * * *